United States Patent [19]

Mann

[11] Patent Number: 6,041,406
[45] Date of Patent: Mar. 21, 2000

[54] PARALLEL AND SERIAL DEBUG PORT ON A PROCESSOR

[75] Inventor: Daniel Mann, Austin, Tex.

[73] Assignee: Advanced Micro Devices, Inc., Sunnyvale, Calif.

[21] Appl. No.: 08/994,518

[22] Filed: Dec. 19, 1997

Related U.S. Application Data

[60] Provisional application No. 60/043,070, Apr. 8, 1997.

[51] Int. Cl.[7] ............................. G06F 11/34; G06F 11/28
[52] U.S. Cl. .............................. 712/227; 714/34; 714/38; 395/704
[58] Field of Search .............................. 714/726, 30, 47, 714/34, 25, 40, 744, 38, 736, 733, 35; 327/277, 30, 296; 712/35, 227; 395/704; 709/102

[56] References Cited

U.S. PATENT DOCUMENTS

| | | | |
|---|---|---|---|
| 3,707,725 | 12/1972 | Dellheim | 444/1 |
| 4,429,368 | 1/1984 | Kurii | 364/580 |
| 4,462,077 | 7/1984 | York | 364/300 |
| 5,058,114 | 10/1991 | Kuboki et al. | 371/19 |
| 5,321,828 | 6/1994 | Phillips et al. | 395/500 |
| 5,355,369 | 10/1994 | Greenbergerl et al. | 371/22.3 |
| 5,357,626 | 10/1994 | Johnson et al. | 395/500 |
| 5,371,689 | 12/1994 | Tatsuma | 364/569 |
| 5,488,688 | 1/1996 | Gonzales et al. | 395/183.1 |
| 5,491,793 | 2/1996 | Somasundaram et al. | 395/183.21 |
| 5,530,804 | 6/1996 | Edgington et al. | 395/183.06 |
| 5,544,311 | 8/1996 | Harenberg et al. | 714/40 |
| 5,590,354 | 12/1996 | Klapproth et al. | 395/800 |
| 5,630,102 | 5/1997 | Johnson et al. | 395/500 |
| 5,634,046 | 5/1997 | Chatterjee et al. | 395/568 |
| 5,642,479 | 6/1997 | Flynn | 395/183.21 |
| 5,724,505 | 3/1998 | Argade et al. | 395/183.21 |
| 5,751,942 | 5/1998 | Christensen et al. | 395/183.14 |
| 5,764,885 | 6/1998 | Sites et al. | 395/183.21 |
| 5,768,152 | 6/1998 | Battaline et al. | 364/551.01 |
| 5,771,240 | 6/1998 | Tobin et al. | 371/22.1 |
| 5,774,708 | 6/1998 | Klingler | 395/568 |
| 5,802,272 | 9/1998 | Sites et al. | 395/183.21 |
| 5,812,562 | 9/1998 | Baeg | 714/726 |
| 5,812,760 | 9/1998 | Mendenhall et al. | 395/815.02 |
| 5,828,824 | 10/1998 | Swoboda | 395/183.01 |
| 5,828,825 | 10/1998 | Eskandari et al. | 395/183.03 |
| 5,848,264 | 12/1998 | Baird et al. | 395/500 |
| 5,901,283 | 5/1999 | Kanzaki | 395/183.14 |

FOREIGN PATENT DOCUMENTS

| | | |
|---|---|---|
| 316609 | 5/1989 | European Pat. Off. . |
| 0530816A3 | 3/1993 | European Pat. Off. . |
| 636976 | 2/1995 | European Pat. Off. . |
| 762276 | 3/1997 | European Pat. Off. . |
| 849670 | 6/1998 | European Pat. Off. . |
| 59-194245 | 11/1984 | Japan . |

OTHER PUBLICATIONS

IBM Technical Disclosure Bulletin, "Trace Array", vol. 35, No. 2, Jul. 1992, pp. 138–140.

(List continued on next page.)

*Primary Examiner*—Daniel H. Pan
*Attorney, Agent, or Firm*—Zagorin, O'Brien & Graham, LLP

[57] ABSTRACT

A processor has both a serial debug port and a parallel debug port. The processor includes a processor core. The serial debug port is formed of a plurality of pins configured to send and receive signals to and from external software debug equipment. The parallel debug port is formed of a plurality of pins and configured to send and receive signals from external software debug equipment. A plurality of debug registers are accessible to the serial debug port and the parallel debug port. The debug registers are also coupled to the processor core for receiving and providing debug data and control signals. The processor core performs various software debug operations in response to signals from the external software debug equipment sent over one of the parallel and serial debug ports and communicates the results of the debug operation back over one of the serial and parallel debug ports.

14 Claims, 10 Drawing Sheets

OTHER PUBLICATIONS

IBM Technical Disclosure Bulletin "Tailorable Embedded Event Trace", vol. 34, No. 7B, Dec. 1991, pp. 259–261.

Intel "Pentium™ Processor User's Manual vol. 3: Architecture and Programming Manual", 1994, pp. 17–1 thru 17–9.

K5 HDT, e–mail describing K5 HDT, Jan. 11, 1997, pp. 1–6.

Motorola "CPU32 Reference Manual", pp 7–1 thru 7–13 (admitted prior to Apr. 8, 1997).

Motorola "MEVB Quick Start Guide", pp. 3–5 thru 7–2 (admitted prior to Apr. 8, 1997).

Revill, Geoff, "Advanced On–chip Debug for ColdFire Developers", Embedded System Engineering, Apr./May 1997, pp. S2–S4.

Larus, James R., Efficient Program Tracing, 8153 Computer, No. 5, May 26, 1993, Los Alamitos, CA, pp. 52–61.

Advanced Micro Devices, "Am29040™ Microprocessor User's Manual—29K Family", Advanced Micro Devices, Inc. 1994, pp. 12–1 through 12–26.

O'Farrell, Ray, "Choosing a Cross–Debugging Methodology", Embedded Systems Programming, Aug. 1997, pp. 84–89.

Ganssle, Jack G., "Vanishing Visibility, Part 2", Embedded Systems Programming, Aug. 1997, pp. 113–115.

Ojennes, Dan, "Debugging With Real–Time Trace", Embedded Systems Programming, Aug. 1997, pp. 50–52, 54, 56, and 58.

| 20 | | | | 15 | | | | | | | | | | | | | | | | 0 |
|---|---|---|---|---|---|---|---|---|---|---|---|---|---|---|---|---|---|---|---|---|
| 0 | 0 | 0 | 0 | 1 | B3 | B2 | B1 | 1 | 0 | 0 | 0 | 0 | 0 | 0 | 0 | 0 | 0 | 0 | 0 | 0 |

TCODE=1        Only 3-bits of BFIELD used

FIG. 6A

| 20 | 19   15 | 0 |
|---|---|---|
| 0 | TCODE=2 | TADDR_H, high 16-bits of EIP target logical address |
| 0 | TCODE=7 | TADDR_L, low 16-bits of EIP target logical address |

FIG. 6B

| 20 | 19   15 | | | | 0 |
|---|---|---|---|---|---|
| 0 | TCODE=8 | TADDR_H, high 16-bits of EIP stop instruction logical address | | | |
| 0 | TCODE=7 | TADDR_L, low 16-bits of EIP stop instruction logical address | | | |
| 0 | TCODE=4 | BADDR_H, high 16-bits of Current segment base address | | | |
| 0 | TCODE=7 | BADDR_L, low bits 15-4 of segment base address | – | PG | SZ | R̄/P |

FIG. 6C

| 20 | 19   15 | | | | 0 |
|---|---|---|---|---|---|
| V̄ | TCODE=1 | 1        BFIELD | | | |
| 0 | TCODE=6 | TADDR_H, high 16-bits of EIP for interrupted instruction logical address | | | |
| 0 | TCODE=7 | TADDR_L, low 16-bits of EIP for interrupted instruction logical address | | | |
| 0 | TCODE=3 | BADDR_H, high 16-bits of previous segment base address | | | |
| 0 | TCODE=7 | BADDR_L, low bits 15-4 of segment base address | – | PG | SZ | R̄/P |
| 0 | TCODE=5 | Vector number | | | |
| 0 | TCODE=7 | TADDR_H, high 16-bits of interrupt handler logical address | | | |
| 0 | TCODE=7 | TADDR_L, low 16-bits of instruction logical address | | | |

FIG. 6D

| 20 | 19 | 15 | | 0 |
|---|---|---|---|---|
| V̄ | TCODE=1 | 1 | BFIELD | |
| 0 | TCODE=3 | BADDR_H, high 16-bits of previous segment base address | | |
| 0 | TCODE=7 | BADDR_L, low bits 15-4 of segment base address | – PG SZ | R̄/P |
| 0 | TCODE=2 | TADDR_H, high 16-bits of long-jump target logical address | | |
| 0 | TCODE=7 | TADDR_L, low 16-bits of long-jump target logical address | | |

FIG. 6E

| 20 | 19 | 15 | 0 |
|---|---|---|---|
| 0 | TCODE=9 | 16-bit value supplied by instruction | |

FIG. 6F

| 20 | 19 | 15 | 0 |
|---|---|---|---|
| 0 | TCODE=6 | TADDR_H, high 16-bits of EIP of current instruction logical address | |
| 0 | TCODE=7 | TADDR_L, low 16-bits of EIP for current instruction logical address | |

FIG. 6G

PARALLEL AND SERIAL DEBUG PORT ON A PROCESSOR

RELATED APPLICATIONS

This application claims priority to U.S. application Ser. No. 60/043,070, filed Apr. 8, 1997, which is hereby incorporated by reference. This application relates to the following applications: "COMBINED PARALLEL DEBUG AND TRACE PORT", by Daniel Mann, Ser. No. 08/992,314, filed Dec. 17, 1997; SOFTWARE DEBUG PORT FOR A MICROPROCESSOR, by Daniel Mann, Ser. No. 08/923,597, filed Aug. 25, 1997, which applications are incorporated herein by reference.

BACKGROUND OF THE INVENTION

1. Field of the Invention

The invention relates to debug support in microprocessors, and more particularly to providing debug ports to support debug operations.

2. Description of the Related Art

The growth in software complexity, coupled with increasing processor clock speeds, has placed an increasing burden on application software developers. The cost of developing and debugging new software products is now a significant factor in processor selection. A processor's failure to adequately facilitate software debug results in longer customer development times and reduces the processor's attractiveness for use within industry. The need to provide software debug support is particularly acute within the embedded products industry, where specialized on-chip circuitry is often combined with a processor core.

In addition to the software engineer, other parties are also affected by debug tool configuration. These parties include: the "trace" algorithm developer who must search through captured software trace data that reflects instruction execution flow in a processor; the in-circuit emulator developer who deals with problems of signal synchronization, clock frequency and trace bandwidth; and the processor manufacturer who does not want a solution that results in increased processor cost or design and development complexity.

With desktop systems, complex multitasking operating systems are currently available to support debugging. However, the initial task of getting these operating systems running reliably often requires special development equipment. While not the standard in the desktop environment, the use of such equipment is often the approach taken within the embedded industry. Logic analyzers, read-only memory (ROM) emulators and in-circuit emulators (ICE) are frequently employed. In-circuit emulators do provide certain advantages over other debug environments, offering complete control and visibility over memory and register contents, as well as overlay and trace memory in case system memory is insufficient. Use of traditional in-circuit emulators, which involves interfacing a custom emulator back-end with a processor socket to allow communication between emulation equipment and the target system, is becoming increasingly difficult and expensive in today's age of exotic packages and shrinking product life cycles.

Assuming full-function in-circuit emulation is required, there are a few known processor manufacturing techniques able to offer the required support for emulation equipment. Most processors intended for personal computer (PC) systems utilize a multiplexed approach in which existing pins are multiplexed for use in software debug. This approach is not particularly desirable in the embedded industry, where it is more difficult to overload pin functionality.

Other more advanced processors multiplex debug pins in time. In such processors, the address bus is used to report software trace information during a BTA—(Branch Target Address) cycle. The BTA-cycle, however, must be stolen from the regular bus operation. In debug environments where branch activity is high and cache hit rates are low, it becomes impossible to hide the BTA-cycles. The resulting conflict over access to the address bus necessitates processor "throttle back" to prevent loss of instruction trace information. In the communications industry, for example, software typically makes extensive use of branching and suffers poor cache utilization, often resulting in 20% throttle back or more. This amount of throttling is unacceptable amount for embedded products which must accommodate real-time constraints.

In another approach, a second "trace" or "slave" processor is combined with the main processor, with the two processors operating in-step. Only the main processor is required to fetch instructions. The second, slave processor is used to monitor the fetched instructions on the data bus and keeps its internal state in synchronization with the main processor. The address bus of the slave processor functions to provide trace information. After power-up, via a JTAG (Joint Test Action Group) input, the second processor is switched into a slave mode of operation. Free from the need to fetch instructions, its address bus and other pins provide the necessary trace information.

Another existing approach involves building debug support into every processor, but only bonding-out the necessary signal pins in a limited number of packages. These specially packaged versions of the processor are used during debug and replaced with the smaller package for final production. This bond-out approach suffers from the need to support additional bond pad sites in all fabricated devices. This can be a burden in small packages and pad limited designs, particularly if a substantial number of extra pins are required by the debug support variant. Additionally, the debug capability of the specially packaged processors is unavailable in typical processor-based production systems.

In yet another approach (the "Background Debug Mode" by Motorola, Inc.) limited on-chip debug circuitry is provided for basic run control. Through a dedicated serial link requiring additional pins, this approach allows a debugger to start and stop the target system and apply basic code breakpoints by inserting special instructions in system memory. Once halted, special commands are used to inspect memory variables and register contents. This serial link, however, does not provide trace support—additional dedicated pins and expensive external trace capture hardware are required to provide instruction trace data.

As mentioned, an additional tool available to the embedded project is the ROM emulator. The ROM emulator replaces system ROM or RAM with a dual ported memory which can be accessed by both the target and host processors. The use of a ROM emulator does provide for fast data and program transfer, which is the primary reason for its selection.

The traditional full-function ICE solution is the most expensive in terms of hardware support. That solution can cost $12K to $15K. The availability of full-function ICE to debuggers is therefore limited because of its high cost. A lower cost approach such as provided by the Motorola BDM approach is strongly preferred by the majority of software engineers because of its relative simplicity from a software engineer's perspective and low cost. A low cost solution can range from a H/W cost of only $100 to several thousand dollars.

Typically, a project can have one or two hardware engineers and six to eight software engineers. Such a project may be able to afford one full function ICE for the project. Thus, most of the software engineers need to be supported by a low-cost option. However, the low cost option may provide for relatively slow data and program transfer.

Thus, the current solutions for software debugging suffer from a variety of limitations, including: increased packaging and development costs, circuit complexity, processor throttling, and bandwidth matching difficulties. Further, there is currently no adequate low-cost procedure for providing trace information. The limitations of the existing solutions are likely to be exacerbated in the future as internal processor clock frequencies continue to increase. It would be desirable to provide support for both the high end user requiring ICE equipment and the low end user satisfied with available serial debug interfaces. Further, it would be desirable to attract both users wanting full function debug capability including high speed access as well as the lower end slower speed access.

SUMMARY OF THE INVENTION

Accordingly, it has been discovered to provide a processor having both a serial debug port and a parallel debug port. The processor includes a processor core and a serial debug port formed of a plurality of pins configured to send and receive signals from external software debug equipment. A parallel debug port is formed of a plurality of pins and configured to send and receive signals from external software debug equipment. A plurality of debug registers are accessible to the serial debug port and the parallel debug port. The debug registers are also coupled to the processor core for receiving and providing debug data and control signals. The processor core performs various software debug operations in response to signals from the external software debug equipment sent over either the parallel and serial debug ports.

In another embodiment the invention provides a method of sending and receiving debug information between a processor-based device and external debug equipment. A serial debug port is provided in the processor-based device and includes a plurality of pins to serially send and receive debug information. A parallel debug port is provided formed of a plurality of pins configured to send and receive debug signals in parallel. A plurality of debug registers are accessed via one of said parallel and serial debug ports, said plurality of debug registers being accessible to both said serial debug port and said parallel debug port. A debug operation is performed in said processor-based device in response to signals received at one of said parallel and serial debug ports. The results of the debug operation are communicated from said processor-based device via one of said parallel and serial debug ports.

BRIEF DESCRIPTION OF THE DRAWINGS

A better understanding of the present invention can be obtained when the following detailed description of the preferred embodiment is considered in conjunction with the following drawings, in which:

FIGS. 6A–6G illustrate the general format of a variety of trace cache entries for reporting instruction execution according to the invention;

DESCRIPTION OF THE PREFERRED EMBODIMENT(S)

Figure 1:
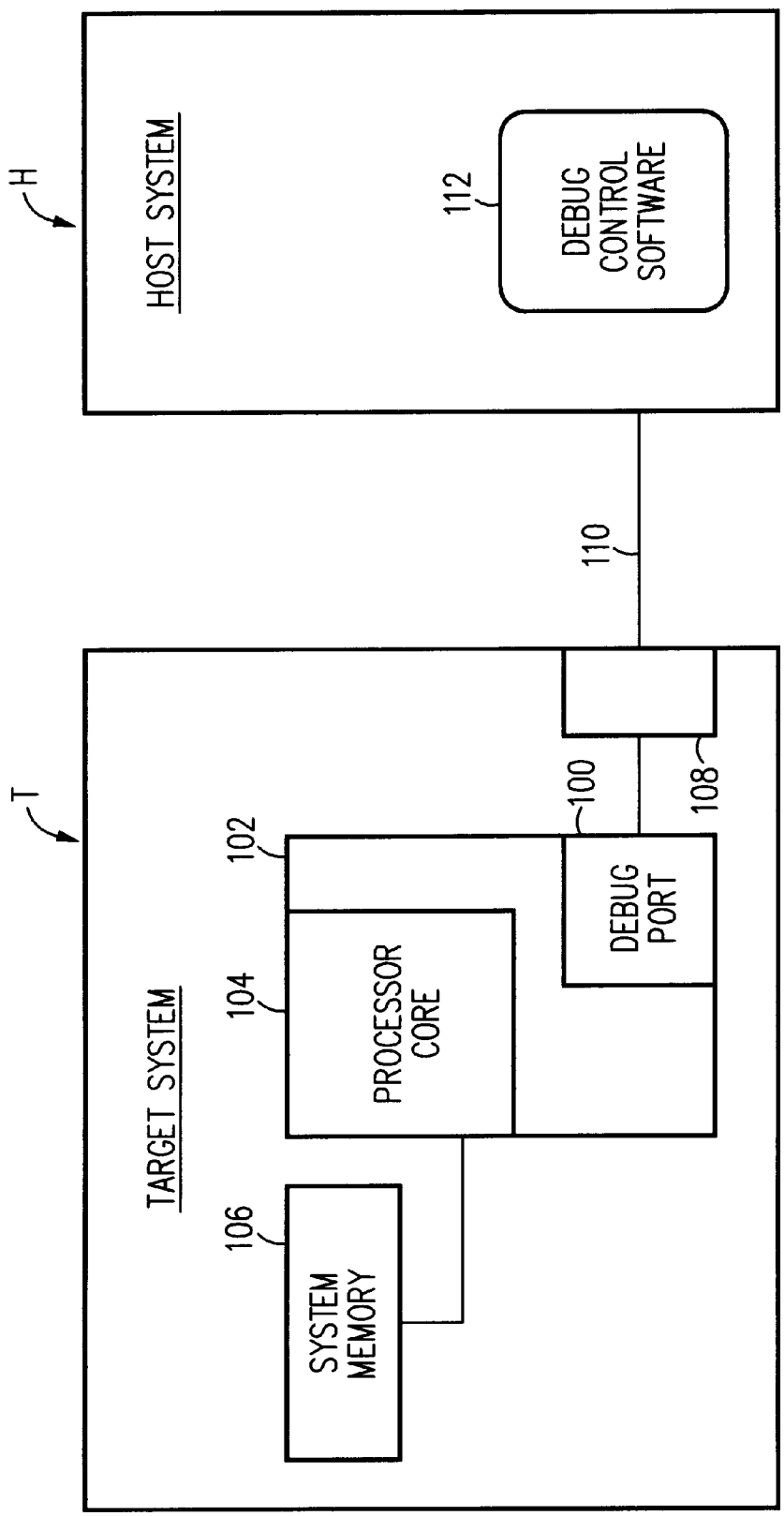
FIG. 1 is a block diagram of a software debug environment utilizing a software debug solution in accordance with the present invention.

Turning now to the drawings, FIG. 1 depicts an exemplary software debug environment illustrating a contemplated use of the present invention. A target system T is shown containing an embedded processor device 102 according to the present invention coupled to system memory 106. The embedded processor device 102 incorporates a processor core 104, an instruction trace memory 200 (FIG. 2), and a debug port 100. Although not considered critical to the invention, the embedded processor device 102 may incorporate additional circuitry (not shown) for performing application specific functions, or may take the form of a stand-alone processor or digital signal processor. Preferably, the debug port 100 uses an IEEE-1149.1-1990 compliant JTAG interface or other similar standardized serial port interface.

A host system H is used to execute debug control software 112 for transferring high-level commands and controlling the extraction and analysis of debug information generated by the target system T. The host system H and target system T of the disclosed embodiment of the invention communicate via a serial link 110. Most computers are equipped with a serial or parallel interface which can be inexpensively connected to the debug port 100 by means of a serial connector 108, allowing a variety of computers to function as a host system H. Alternatively, the serial connector 108 could be replaced with higher speed JTAG-to-network conversion equipment. Further, the target system T can be configured to analyze debug/trace information internally.

Figure 2:
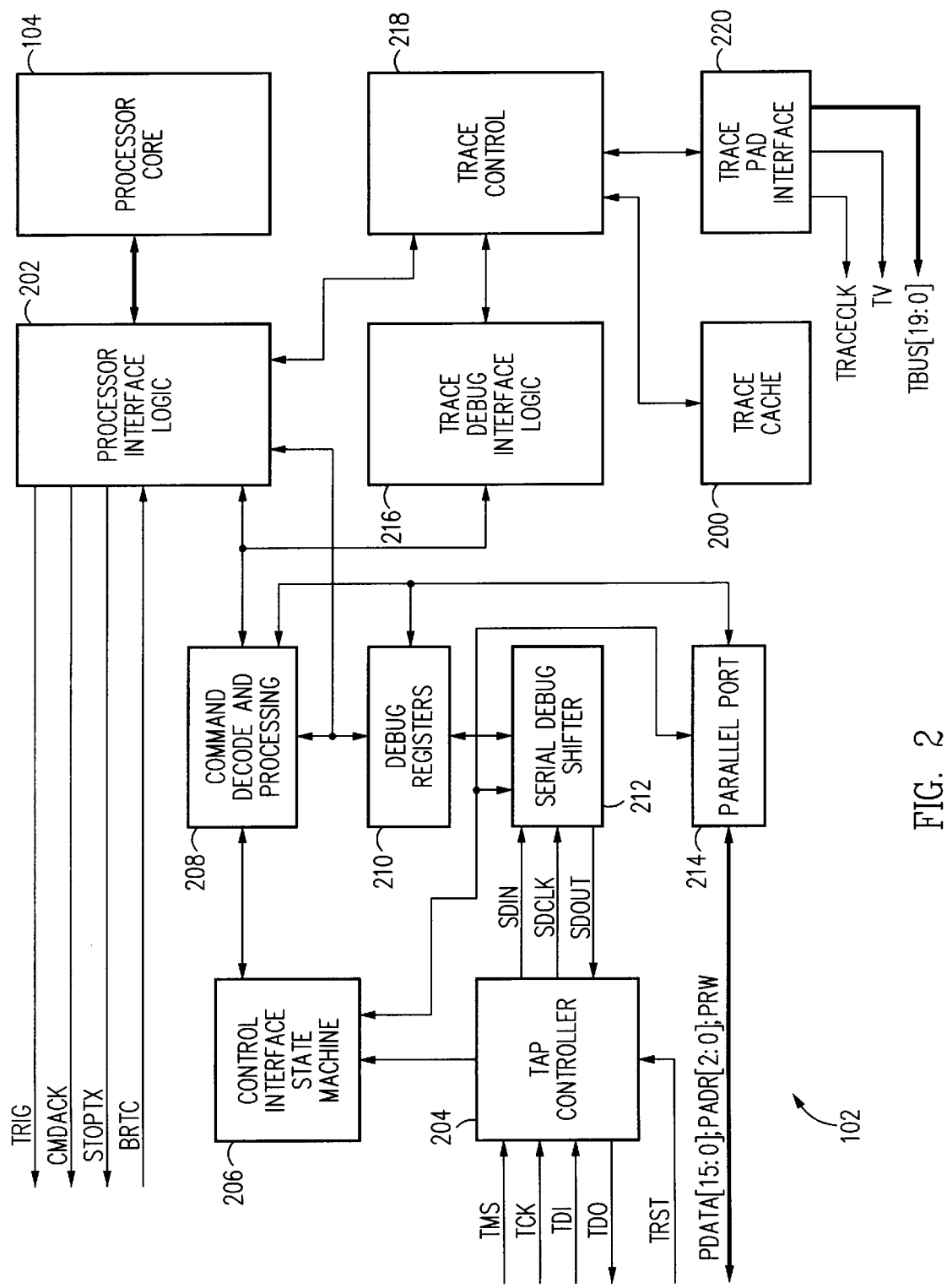
FIG. 2 is a block diagram providing details of an exemplary embedded processor product incorporating an on-chip instruction trace cache according to the present invention.

Referring now to FIG. 2, details of an embedded processor device 102 according to the present invention are provided. In addition to the processor core 104, FIG. 2 depicts various elements of an enhanced embodiment of the debug port 100 capable of utilizing and controlling the trace memory (also referred to herein as trace cache) 200. Many other configurations are possible, as will become apparent to those skilled in the art, and the various processor device 102 components described below are shown for purposes of illustrating the benefits associated with providing an on-chip trace cache 200.

Of significance to the disclosed embodiment of the invention, the trace control circuitry 218 and trace cache 200 operate to provide trace information for reconstructing instruction execution flow in the processor core 104. The trace control circuitry 218 supports "tracing" to a trace pad interface port 220 or to the instruction trace cache 200 and provides user control for selectively activating instruction trace capture. Other features enabled by the trace control circuitry 218 include programmability of synchronization address generation and user specified trace records, as discussed in greater detail below. The trace control circuitry 218 also controls a trace pad interface port 220. When utilized, the trace pad interface port 220 is capable of providing trace data while the processor core 104 is executing instructions, although clock synchronization and other issues may arise. The instruction trace cache 200 addresses many of these issues, improving bandwidth matching and alleviating the need to incorporate throttle-back circuitry in the processor core 104.

At a minimum, only the conventional JTAG pins need be supported in the software debug port 100 in the described embodiment of the invention. The JTAG pins essentially become a transportation mechanism, using existing pins, to enter commands to be performed by the processor core 104. More specifically, the test clock signal TCK, the test mode select signal TMS, the test data input signal TDI and the test data output signal TDO provided to and driven by the JTAG Test Access Port (TAP) controller 204 are conventional JTAG support signals and known to those skilled in the art. As discussed in more detail below, an "enhanced" embodiment of the debug port 100 adds the command acknowledge signal CMDACK, the break request/trace capture signal BRTC, the stop transmit signal STOPTX, and the trigger signal TRIG to the standard JTAG interface. The additional signals allow for pinpoint accuracy of external breakpoint assertion and monitoring, triggering of external devices in response to internal breakpoints, and elimination of status polling of the JTAG serial interface. These "sideband" signals offer extra functionality and improve communications speeds for the debug port 100. These signals also aid in the operation of an optional parallel port 214 provided on special bond-out versions of the disclosed embedded processor device 102.

Via the conventional JTAG signals, the JTAG TAP controller 204 accepts standard JTAG serial data and control. When a DEBUG instruction has been written to the JTAG instruction register, a serial debug shifter 212 is connected to the JTAG test data input signal TDI and test data output signal TDO, such that commands and data can then be loaded into and read from debug registers 210. In the disclosed embodiment of the invention, the debug registers 210 include two debug registers for transmitting (TX_DATA register) and receiving (RX_DATA register) data, an instruction trace configuration register (ITCR), and a debug control status register (DCSR).

A control interface state machine 206 coordinates the loading/reading of data to/from the serial debug shifter 212 and the debug registers 210. A command decode and processing block 208 decodes commands/data and dispatches them to processor interface logic 202 and trace debug interface logic 216. In addition to performing other functions, the trace debug interface logic 216 and trace control logic 218 coordinate the communication of trace information from the trace cache 200 to the TAP controller 204. The processor interface logic 202 communicates directly with the processor core 104, as well as the trace control logic 218. As described more fully below, parallel port logic 214 communicates with a control interface state machine 206 and the debug registers 210 to perform parallel data read/write operations in optional bond-out versions of the embedded processor device 102.

Before debug information is communicated via the debug port 100 using only conventional JTAG signals, the port 100 is enabled by writing the public JTAG instruction DEBUG into a JTAG instruction register contained within the TAP controller 204. As in Table 1, the JTAG instruction register of the disclosed embodiment is a 38-bit register comprising a 32-bit data field (debug_data{31:0}), a four-bit command field to point to various internal registers and functions provided by the debug port 100, a command pending flag, and a command finished flag. It is possible for some commands to use bits from the debug_data field as a sub-field to extend the number of available commands.

TABLE 1

| 37         | 5       | 2 1 | 0 |
|------------|---------|-----|---|
| debug_data | command | P   | F |

This JTAG instruction register is selected by toggling the test mode select signal TMS. The test mode select signal TMS allows the JTAG path of clocking to be changed in the scan path, enabling multiple paths of varying lengths to be used. Preferably, the JTAG instruction register is accessible via a short path. This register is configured to include a soft register for holding values to be loaded into or received from specified system registers.

Figure 3:
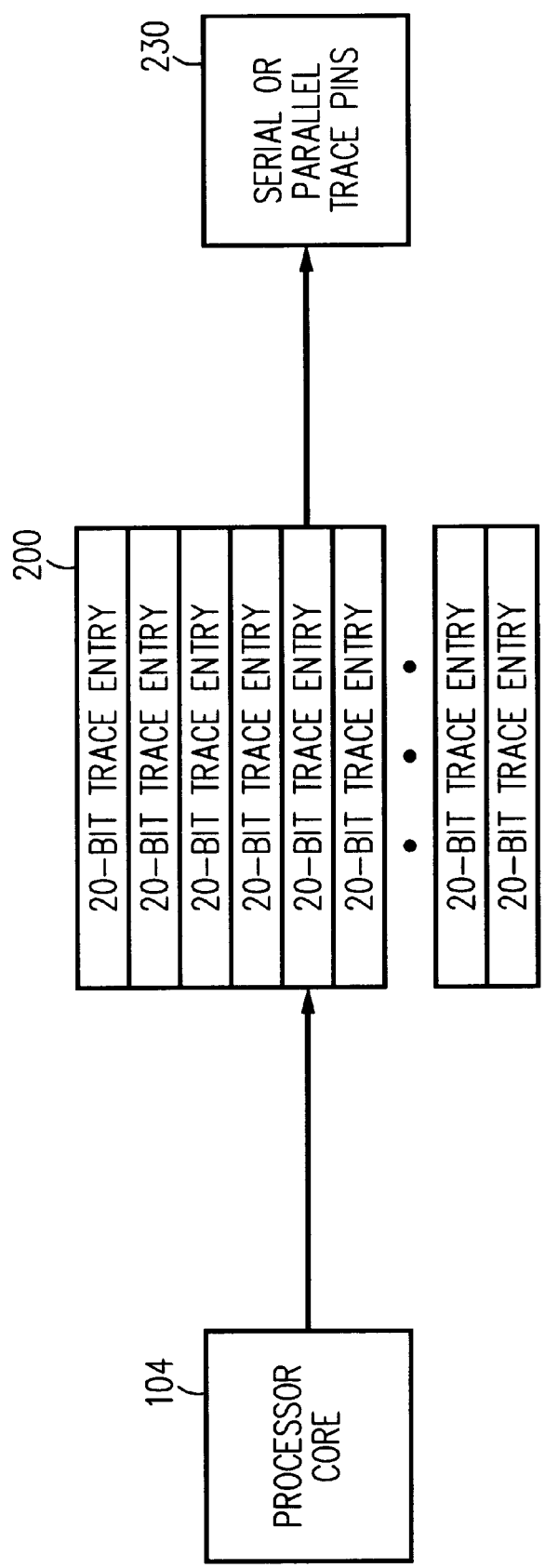
FIG. 3 is a simplified block diagram depicting the relationship between an exemplary instruction trace cache and other components of an embedded processor product according to the present invention.

Referring now to FIG. 3, a simplified block diagram depicting the relationship between an exemplary instruction trace memory 200 and other components of an embedded processor device 102 according to the present invention is shown. In one contemplated embodiment of the invention, the trace memory 200 is a 128 entry first-in, first-out (FIFO) circular memory that records the most recent trace entries. Increasing the size of the trace memory 200 increases the amount of instruction trace information that can be captured, although the amount of required silicon area may increase.

As described in more detail below, the trace memory 200 of the disclosed embodiment of the invention stores a plurality of 20-bit (or more) trace entries indicative of the order in which instructions are executed by the processor core 104. Other information, such as task identifiers and trace capture stop/start information, can also be placed in the trace memory 200. The contents of the trace memory 200 are provided to external hardware, such as the host system H, via either serial or parallel trace pins 230. Alternatively, the target system T can be configured to examine the contents of the trace cache 200 internally.

Figure 4:
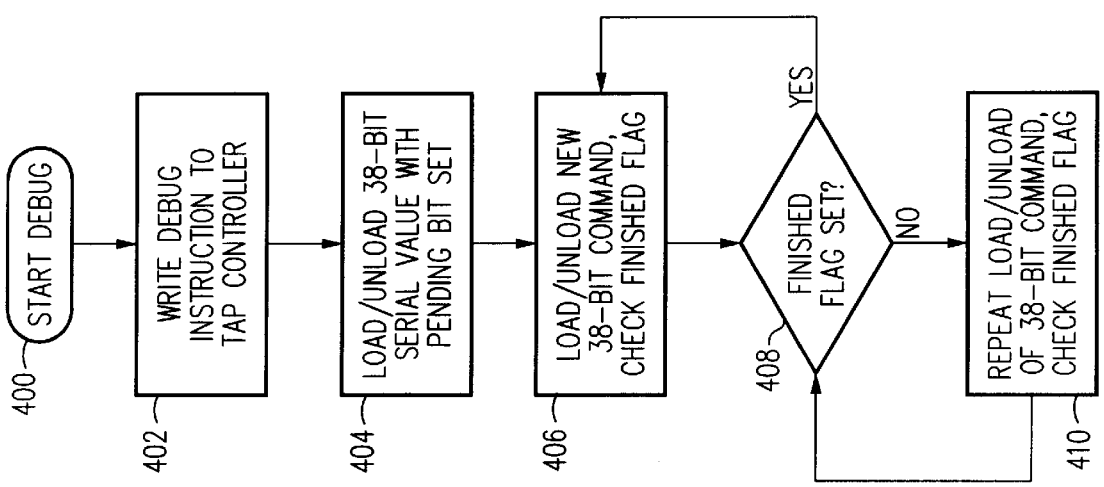
FIG. 4 is a flowchart illustrating software debug command passing according to one embodiment of the invention.

FIG. 4 provides a high-level flow chart of command passing when using a standard JTAG interface. Upon entering debug mode in step 400 the DEBUG instruction is written to the TAP controller 204 in step 402. Next, step 404, the 38-bit serial value is shifted in as a whole, with the command pending flag set and desired data (if applicable, otherwise zero) in the data field. Control proceeds to step 406 where the pending command is loaded/unloaded and the command finished flag checked. Completion of a command typically involves transferring a value between a data register and a processor register or memory/IO location. After the command has been completed, the processor 104 clears the command pending flag and sets the command finished flag, at the same time storing a value in the data field if applicable. The entire 38-bit register is shifted out to the host to monitor the command finished and command pending flags. If the pending flag is reset to zero and the finished flag is set to one, the previous command has finished. The status of the flags is captured by the control interface state machine 206. A slave copy of the flags' status is saved internally to determine if the next instruction should be loaded. The slave copy is maintained due to the possibility of a change in flag status between TAP controller 204 states. This allows the processor 104 to determine if the previous instruction has finished before loading the next instruction.

If the finished flag is not set as determined in step 408, control proceeds to step 410 and the loading/unloading of the 38-bit command is repeated. The command finished flag is also checked. Control then returns to step 408. If the finished flag is set as determined in step 408, control returns to step 406 for processing of the next command. DEBUG mode is exited via a typical JTAG process.

Returning to FIG. 2, the aforementioned optional sideband signals are utilized in the enhanced debug port 100 to provide extra functionality. The optional sideband signals include a break request/trace capture signal BRTC that can function as a break request signal or a trace capture enable signal depending on the status of bit set in the debug control/status register. If the break request/trace capture signal BRTC is set to function as a break request signal, it is asserted to cause the processor 104 to enter debug mode (the processor 104 can also be stopped by scanning in a halt command via the convention JTAG signals). If set to function as a trace capture enable signal, asserting the break request/trace capture signal BRFC enables trace capture. Deasserting the signal turns trace capture off. The signal takes effect on the next instruction boundary after it is detected and is synchronized with the internal processor clock. The break request/trace capture signal BRTC may be asserted at any time.

The trigger signal TRIG is configured to pulse whenever an internal processor breakpoint has been asserted. The trigger signal TRIG may be used to trigger an external capturing device such as a logic analyzer, and is synchronized with the trace record capture clock signal TRACECLK. When a breakpoint is generated, the event is synchronized with the trace capture clock signal TRACECLK, after which the trigger signal TRIG is held active for the duration of trace capture.

The stop transmit signal STOPTX is asserted when the processor 104 has entered DEBUG mode and is ready for register interrogation/modification, memory or I/O reads and writes through the debug port 100. In the disclosed embodiment of the invention, the stop transmit signal STOPTX reflects the state of a bit in the debug control status register (DCSR). The stop transmit signal STOPTX is synchronous with the trace capture clock signal TRACECLK.

Figure 5:
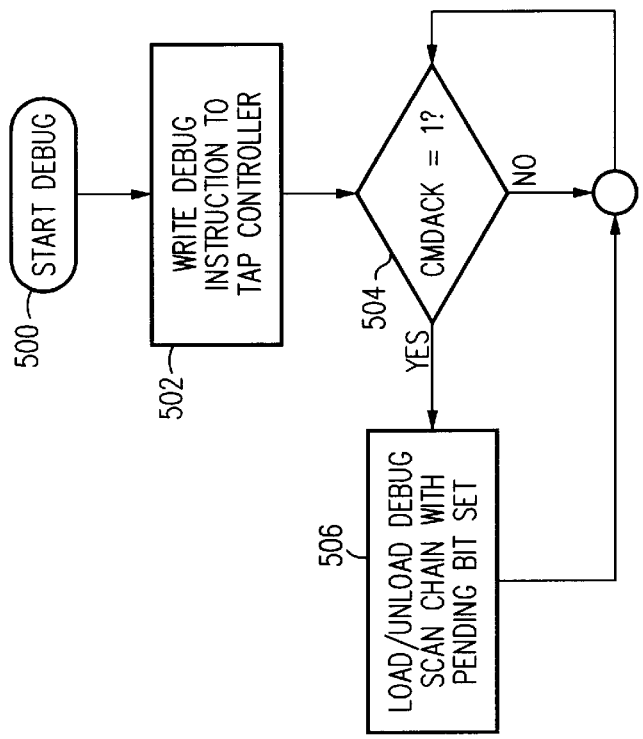
FIG. 5 is a flowchart illustrating enhanced software port command passing according to a second embodiment of the invention.

The command acknowledge signal CMDACK is described in conjunction with FIG. 5, which shows simplified command passing in the enhanced debug port 100 of FIG. 2. Again, to place the target system T into DEBUG mode, a DEBUG instruction is written to the TAP controller 204 in step 502. Control proceeds to step 504 and the command acknowledge signal CMDACK is monitored by the host system H to determine command completion status. This signal is asserted high by the target system T simultaneously with the command finished flag and remains high until the next shift cycle begins. When using the command acknowledge signal CMDACK, it is not necessary to shift out the JTAG instruction register to capture the command finished flag status. The command acknowledge signal CMDACK transitions high on the next rising edge of the test clock signal TCK after the command finished flag has changed from zero to one. When using the enhanced JTAG signals, a new shift sequence (step 506) is not started by the host system H until the command acknowledge signal CMDACK pin has been asserted high. The command acknowledge signal CMDACK is synchronous with the test clock signal TCK. The test clock signal TCK need not be clocked at all times, but is ideally clocked continuously when waiting for a command acknowledge signal CMDACK response.

Also included in debug register block 210 is an instruction trace configuration register (ITCR) shown in Table 2. This 32-bit register provides for the enabling/disabling and configuration of instruction trace debug functions. Numerous such functions are contemplated, including various levels of tracing, trace synchronization force counts, trace initialization, instruction tracing modes, clock divider ratio information, as well as additional functions shown in the following table. The ITCR is accessed through a JTAG instruction register write/read command as is the case with the other registers of the debug register block 210, or via a reserved instruction.

TABLE 2

| BIT | SYMBOL | DESCRIPTION/FUNCTION |
| --- | --- | --- |
| 31:30 | Reserved | Reserved |
| 29 | RXINTEN | Enables interrupt when RX bit is set |
| 28 | TXINTEN | Enables interrupt when TX bit is set |
| 27 | TX | Indicates that the target system T is ready to transmit data to the host system H and the data is available in the TX_DATA register |
| 26 | RX | Indicates that data has been received from the host and placed in the RX_DATA register |
| 25 | DISL1TR | Disables level 1 tracing |
| 24 | DISL0TR | Disables level 0 tracing |
| 23 | DISCSB | Disables current segment base trace record |
| 22:16 | TSYNC{6:0} | Sets the maximum number of Branch Sequence trace records that may be output by the trace control block 218 before a synchronizing address record is forced |
| 15 | TSR3 | Sets or clears trace mode on DR3 trap |
| 14 | TSR2 | Sets or clears trace mode on DR2 trap |
| 13 | TSR1 | Sets or clears trace mode on DR1 trap |
| 12 | TSR0 | Sets or clears trace mode on DR0 trap |
| 11 | TRACE3 | Enables Trace mode toggling using DR3 |
| 10 | TRACE2 | Enables Trace mode toggling using DR2 |
| 9 | TRACE1 | Enables Trace mode toggling using DR1 |
| 8 | TRACE0 | Enables Trace mode toggling using DR0 |
| 7 | TRON | Trace on/off |

TABLE 2-continued

| BIT | SYMBOL | DESCRIPTION/FUNCTION |
|---|---|---|
| 6:4 | TCLK{2:0} | Encoded divider ratio between internal processor clock and TRACECLK |
| 3 | ITM | Sets internal or external (bond-out) instruction tracing mode |
| 2 | TINIT | Trace initialization |
| 1 | TRIGEN | Enables pulsing of external trigger signal TRIG following receipt of any legacy debug breakpoint; independent of the Debug Trap Enable function in the DCSR |
| 0 | GTEN | Global enable for instruction tracing through the internal trace buffer or via the external (bond-out) interface |

Another debug register, the debug control/status register (DCSR) shown in Table 3, provides an indication of when the processor 104 has entered debug mode and allows the processor 104 to be forced into DEBUG mode through the enhanced JTAG interface. As shown in the following table, the DCSR also enables miscellaneous control features, such as: forcing a ready signal to the processor 104, controlling memory access space for accesses initiated through the debug port, disabling cache flush on entry to the DEBUG mode, the TX and RX bits, the parallel port 214 enable, forced breaks, forced global reset, and other functions. The ordering or presence of the various bits in either the ITCR or DCSR is not considered critical to the operation of the invention.

Via debug port 100 commands, the host system H can then determine the reason that DEBUG mode was entered, and respond by retrieving the data from the reserved region. However, while the processor 104 is in DEBUG mode, normal processor execution is stopped. As noted above, this is undesirable for many real-time systems.

This situation is addressed according to the present invention by providing two debug registers in the debug port 100 for transmitting (TX_DATA register) and receiving (RX_DATA register) data. These registers can be accessed using the soft address and JTAG instruction register commands. As noted, after the host system H has written a debug instruction to the JTAG instruction register, the serial debug shifter 212 is coupled to the test data input signal TDI line and test data output signal TDO line.

TABLE 3

| BIT | SYMBOL | DESCRIPTION/FUNCTION |
|---|---|---|
| 31:12 | Reserved | Reserved |
| 11 | TX | Indicates that the target system T is ready to transmit data to the host system H and the data is available in the TX_DATA register |
| 10 | RX | Indicates that data has been received from the host and placed in the RX_DATA register |
| 9 | DISFLUSH | Disables cache flush on entry to DEBUG mode |
| 8 | SMMSP | Controls memory access space (normal memory space/system management mode memory) for accesses initiated through the Debug Port 100 |
| 7 | STOP | Indicates whether the processor 104 is in DEBUG mode (equivalent to stop transmit signal STOPTX) |
| 6 | FRCRDY | Forces the ready signal RDY to the processor 104 to be pulsed for one processor clock; useful when it is apparent that the processor 104 is stalled waiting for a ready signal from a non-responding device |
| 5 | BRKMODE | Selects the function of the break request/trace capture signal BRTC (break request or trace capture on/off) |
| 4 | DBTEN | Enables entry to debug mode or toggle trace mode enable on a trap/fault via processor 104 registers DR0–DR7 or other legacy debug trap/fault mechanisms |
| 3 | PARENB | Enables parallel port 214 |
| 2 | DSPC | Disables stopping of internal processor clocks in the Halt and Stop Grant states |
| 1 | FBRK | Forces processor 104 into DBBUG mode at the next instruction boundary (equivalent to pulsing the external BRTC pin) |
| 0 | FRESET | Forces global reset |

When in cross debug environment such as that of FIG. 1, it is necessary for the parent task running on the target system T to send information to the host platform H controlling it. This data may consist, for example, of a character stream from a printf( ) call or register information from a Task's Control Block (TCB). One contemplated method for transferring the data is for the operating system to place the data in a known region, then via a trap instruction, cause DEBUG mode to be entered.

When the processor 104 executes code causing it to transmit data, it first tests a TX bit in the ITCR. If the TX bit is set to zero then the processor 104 executes a processor instruction (either a memory or I/O write) to transfer the data to the TX_DATA register. The debug port 100 sets the TX bit in the DCSR and ITCR, indicating to the host system H that it is ready to transmit data. Also, the STOPTX pin is set high. After the host system H completes reading the transmit data from the TX_DATA register, the TX bit is set to zero.

A TXINTEN bit in the ITCR is then set to generate a signal to interrupt the processor 104. The interrupt is generated only when the TX bit in the ITCR transitions to zero. When the TXINTEN bit is not set, the processor 104 polls the ITCR to determine the status of the TX bit to further transmit data.

When the host system H desires to send data, it first tests a RX bit in the ITCR. If the RX bit is set to zero, the host system H writes the data to the RX_DATA register and the RX bit is set to one in both the DCSR and ITCR. A RXINT bit is then set in the ITCR to generate a signal to interrupt the processor 104. This interrupt is only generated when the RX in the ITCR transitions to one. When the RXINTEN bit is not set, the processor 104 polls the ITCR to verify the status of the RX bit. If the RX bit is set to one, the processor instruction is executed to read data from the RX_DATA register. After the data is read by the processor 104 from the RX_DATA register the RX bit is set to zero. The host system H continuously reads the ITCR to determine the status of the RX bit to further send data.

This technique enables an operating system or application to communicate with the host system H without stopping processor 104 execution. Communication is conveniently achieved via the debug port 100 with minimal impact to on-chip application resources. In some cases it is necessary to disable system interrupts. This requires that the RX and TX bits be examined by the processor 100. In this situation, the communication link is driven in a polled mode.

Figure 7A:
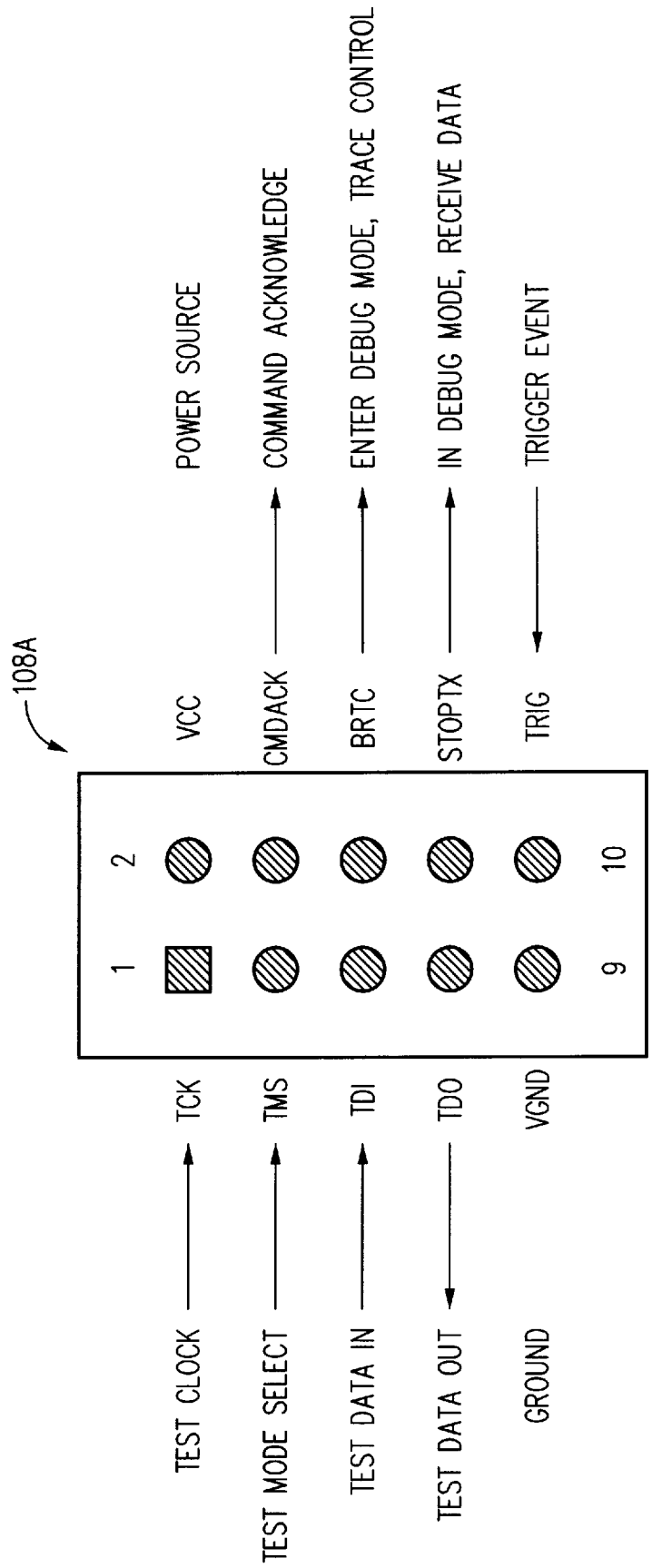
FIGS. 7A and 7B depict exemplary serial debug port connectors for use in a debug environment in accordance with the invention.
Figure 7B:
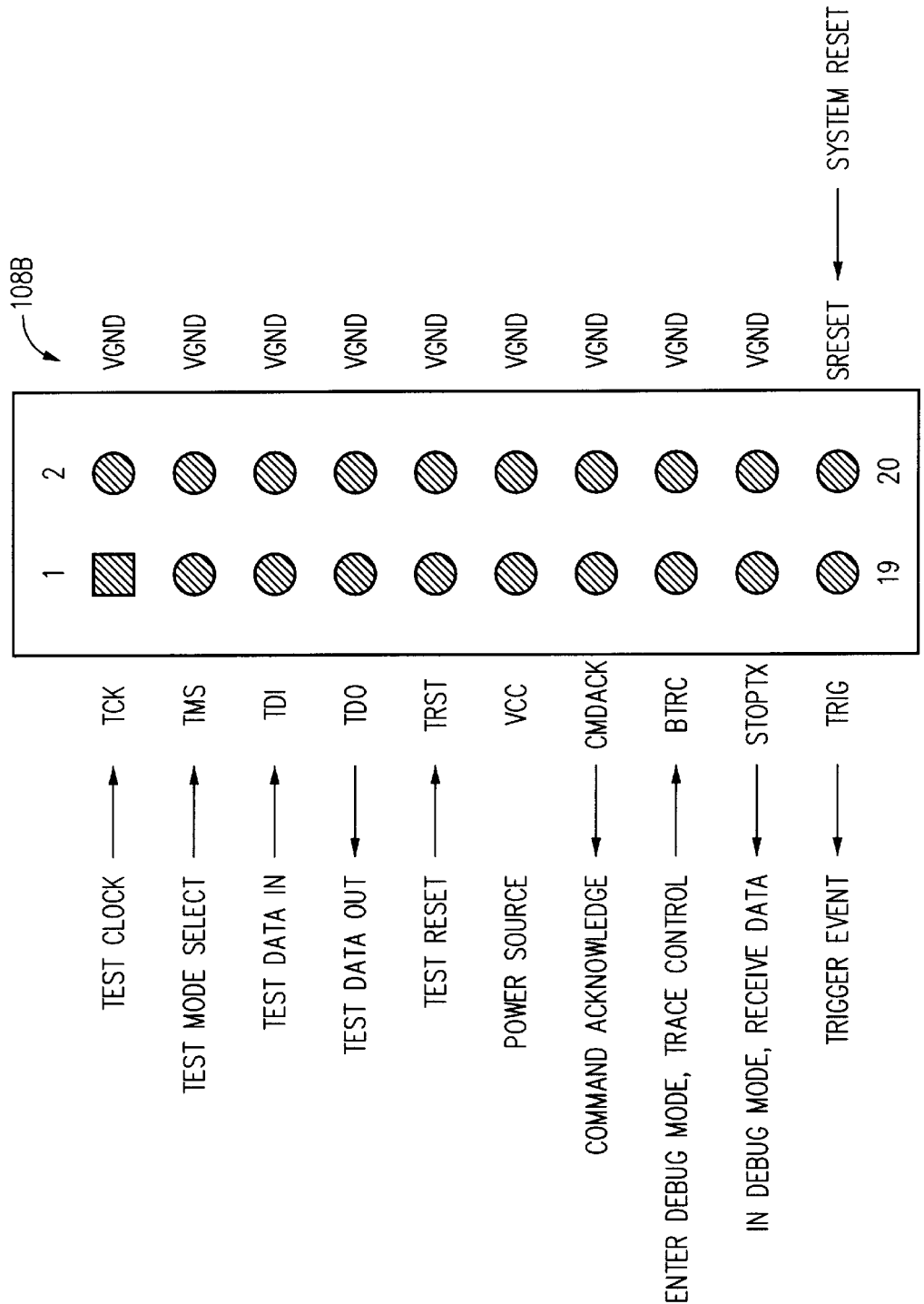

FIGS. 7A and 7B depict exemplary serial debug port connectors for use in a debug environment in accordance with the invention. Referring to FIG. 7B, a 20-pin serial connector 108B is shown. This version of the serial connector 108 is preferred in situations in which the serial connector is clocked at high speeds (e.g., above 10 MHz) where there is a danger of signal cross-talk. Although the signals of the connector 108A of FIG. 7A are identical to those of FIG. 7B, the 20-pin arrangement places a ground wire between each signal wire to reduce signal cross-talk. It should be noted that voltage level conversion may be required in the serial connector 108A or 108B to ensure correct voltage levels for connecting a host system H or other interface. The precise ordering of the debug port 100 signals provided by the serial connectors 108A and 108B is not considered critical to the invention.

Thus, the processor-based device incorporates a software debug port that utilizes a JTAG or similar standardized interface that provides a serial debug communication mechanism that does not require a special bond-out package. When used in conjunction with an on-chip trace cache, the software debug port is capable of providing trace information for reconstructing instruction execution flow on the processor and is also capable of examining register contents without halting processor operation. The software debug port alleviates many packaging and clock synchronization problems.

However, some embedded systems require instruction trace to be examined while maintaining I/O and data processing operations. A bond-out version of the embedded processor device 102 may therefore be preferable. The bond-out version not only provides trace data but also provides a higher bandwidth parallel debug port that can provide load and unloads more quickly as compared to the serial debug port.

Thus, in the disclosed embodiment of the invention, an optional bond-out version of the embedded processor device 102 is provided in which a communication port is provided that can be selected as a parallel debug port or a trace port. The parallel debug port is a high performance port 214 which physically shares a substantial number of the bond-out pads utilized by the instruction trace port 220. The trace port 220 provides external trace capability while the parallel debug port 214 provides parallel command and data access to the debug port 100. The input/output terminals of the bond-out port are shown in Table 4. Some of the pins of the bond-out port are exclusive to the parallel port, some are exclusive to the trace port and the remainder shared. In the embodiment shown, 20 bits are shared (PDATA, PADR and PRW). When the port is selected as a debug port, the TCK is used to synchronize all data transactions. TCK should be continually clocked when the parallel debug interface is enabled. When the port is selected as a trace port, the TRACECLK is provided to synchronize the output data.

The parallel port 214 provides a 16-bit wide bi-directional data bus (PDATA{15:0}), a 3-bit address bus (PADR{2:0}), a parallel debug port read/write select signal (PRW). In addition the bond out port includes a trace valid signal TV and an instruction trace record output clock TRACECLK utilized when the port is being used as a trace port. Although not shared with the trace interface port 220, a parallel bus request/grant signal pair PBREQ/PBGNT are also provided.

The parallel port 214 is enabled by setting a bit in the DCSR. Serial communications via the debug port 100 are not disabled when the parallel port 214 is enabled.

TABLE 4

| Name | I/O | Resistor | Sync Clock | Description |
| --- | --- | --- | --- | --- |
| TRACECLK | Output | — | — | Instruction Trace record output clock |
| TV | Output | PD | TRACECLK | 0 = Valid trace record, 1 = no trace record<br>This pin not shared with parallel bus interface |
| PDATA[15:0] | Bidi | PD | TCK/TRACECLK | Parallel debug port data path. Shared with pins TBUS[15:0] |
| PADR[2:0] | Bidi | PD | TCK/TRACECLK | Parallel debug port address. Shared with pins TBUS[18:16] |
| PRW | Bidi | PD | TCK/TRACECLK | Parallel debug port read/write select. Shared with TBUS[19] pin<br>1 = Perform a parallel read from the serial debug register<br>0 = Perform a parallel write to the serial debug register |

TABLE 4-continued

| Name | I/O | Resistor | Sync Clock | Description |
|------|-----|----------|------------|-------------|
| PBREQ | Output | | TCK | 1 = Request Host to enable parallel bus interface<br>0 = Request Host to disable parallel bus interface<br>This pin not shared with trace bus, interface. |
| PBGNT | Input | PD | TCK | 1 = Host has enabled parallel bus interface<br>0 = Host has disabled parallel bus interface<br>This pin not shared with trace bus interface |

The parallel port 214 provides for fast downloads/uploads to and from target system T memory. The parallel port 214 may be used for all debug communications with the target system T whenever the processor 104 is stopped. The serial debug signals (standard or enhanced) are used for debug access to the target system T when the processor 104 is executing instructions.

In a similar manner to the JTAG standard, all inputs to the parallel port 214 are sampled on the rising edge of the test clock signal TCK, and all outputs are changed on the falling edge of the test clock signal TCK. In the disclosed embodiment, parallel commands are initiated only while the processor 104 is stopped and the external trace interface 220 is disconnected from the shared bus. Any transaction started on the parallel port must complete on the parallel port. Similarly, any transaction begun on the serial port completes there.

The parallel bus request signal PBREQ and parallel bus grant signal PBGNT are provided to expedite multiplexing of the shared bus signals between the trace cache 200 and the parallel port 214. When the host interface to the parallel port 214 determines that the parallel bus request signal PBREQ is asserted, it begins driving the parallel port 214 signals and asserts the parallel bus grant signal PBGNT.

Figure 8:
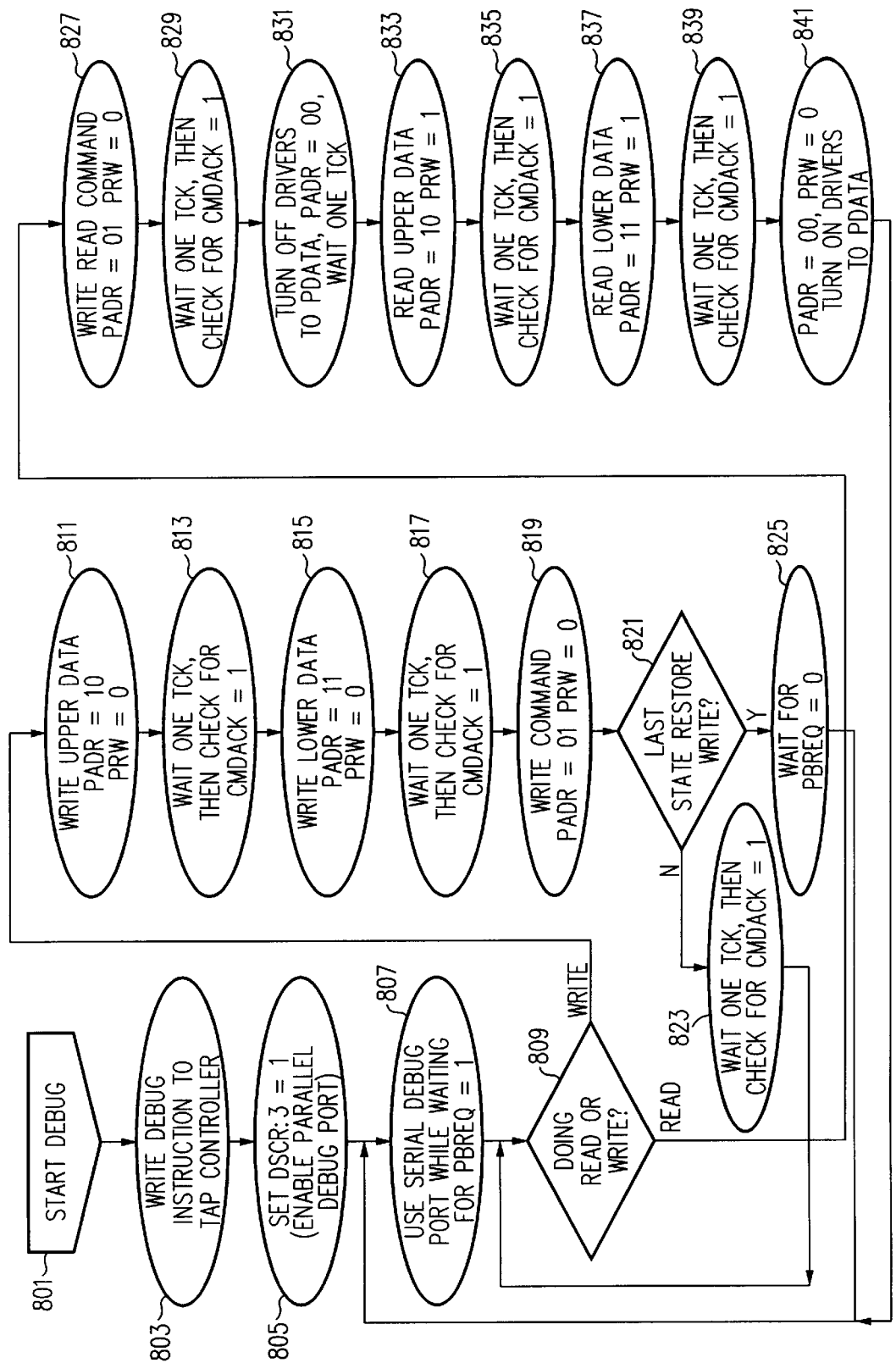
FIG. 8 is a flow chart is shown illustrating the communication protocol on the parallel port.

Referring to FIG. 8, a flow chart is shown illustrating the protocol debug host H follows when communicating via the parallel port. When communicating via the parallel port 214, the address pins PADR{2:0} are used to select the field of the internal debug register, which is mapped to the 16-bit data bus PDATA{15:0} as shown in table 5:

TABLE 5

| PADR{2:0} | Data Selection |
|-----------|----------------|
| 0 0 0 | No selection (null operation) |
| 0 0 1 | 4-bit command register; command driven PDATA{3:0} |
| 0 1 0 | High 16-bits of debug_data |
| 0 1 1 | Low 16-bits of debug_data |
| 100–111 | Reserved |

The debug host H begins a debug operation at 801 by writing over the serial port to the TAP controller in step 803. The parallel debug port 214 is enabled by setting bit 3 of the DSCR register to 1 as shown in step 805. The serial port may be used while waiting for PBREQ to be asserted by parallel debug port 214. If a write operation is being performed, the upper data word is written with the PADR bits set=10 and the PRW bit set to indicate a write operation. It is not necessary to update both halves of the debug_data {31:0} register if only one of the halves is being used (e.g., on 8-bit I/O cycle data writes). In step 713, debug host H waits for one TCK cycle and then checks for assertion of a command acknowledge signal. Then in 815 the lower 16 bits of debug data can be written and again the host H waits for one TCK cycle before checking for assertion of the command acknowledge signal. Step 819 shows the host writing to the command register. As discussed, the data for the command register is driven on PDATA{3:0}.

When entering or leaving DEBUG mode with the parallel port 214 enabled, the parallel port 214 may be used for the processor state save and restore cycles if required. The parallel bus request signal PBREQ is asserted immediately before the beginning of a save state sequence penultimate to entry of DEBUG mode. If it is the last restore state cycle as shown in 821, the parallel bus request signal PBREQ is deasserted after latching the write data. On state save reads, the command code is loaded with the pending bit set. When the finished flag is set or CMDACK is asserted, the save state data is placed in debug_data[31:0]. If there is no save state data left to read, the command field will read back all zeros; if there is additional save state data to read, the command field will read back all ones. On state restore writes, the restore data is loaded into debug_data[31:0] with the command code and the pending bit set. When the finished flag/CMDACK pin is set, and the command field reads back all ones, the processor is ready for the next restore transaction. When the finished flag/CMDACK pin is set and the command field reads back all zeros, the state restore is complete. The save/restore data sequence is given in Table 6.

TABLE 6

| | Save/restore sequence | | |
|---|---|---|---|
| Sequence # | Name | Size | Description |
| 0 | CR0 | [31:0] | Register CR0 |
| 1 | DR6 | [31:0] | Register DR6 |
| 2 | DR7 | [31:0] | Register DR7 |

The host H responds to the parallel bus request signal PBREQ deassertion (825) by tri-stating its parallel port drivers and deasserting the parallel bus grant signal PBGNT. The parallel port 214 returns control to the trace port 220, the trace port 220 pin drivers are enabled, last restore state cycle is completed, and the command acknowledge signal CMDACK is asserted. Control of the interface is thus returned to trace control logic 218.

If it is not the last state restore write in 821, then the host H waits for one TCK cycle and then checks for assertion of the command acknowledge signal in 823 and waits to perform a read or write operation in 809.

If in 809 a read operation is desired to be performed over the parallel debug port 214 instead of a write operation, then a write to the debug command register takes place in 827 with PADR=01 to designate the command register with the appropriate data being driven on PDATA{3:0} with the read/write bit PRW indicating a write. The host H then waits one TCK and checks for completion of the command in 829. The host H then turns off its drivers to PDATA, sets PADR=00 and waits one TCK period in 831. The host H then sets the read/write bit to a read and reads the upper data word with PADR=10 in step 833. The host H then waits one TCK and checks for completion of the command in 839. In step 841, the host H sets PADR=00, sets the read/write bit to indicate write and starts driving the PDATA lines again in 841. The host then returns to step 809 to perform the next read or write operation.

If debug_data{31:0} is not updated between successive write commands, as when filling a block of memory with identical data, or if a write command with no data follows a read command, it is necessary to drive PADR{2:0} to 000 for one TCK between successive write commands. Note that the internal pending and finished flags are not addressable. The command pending flag is automatically set when performing a write operation to the four-bit command register, and is cleared when the command finished flag is asserted. The host system H can monitor the command acknowledge signal CMDACK to determine when the finished flag has been asserted.

Figure 9:
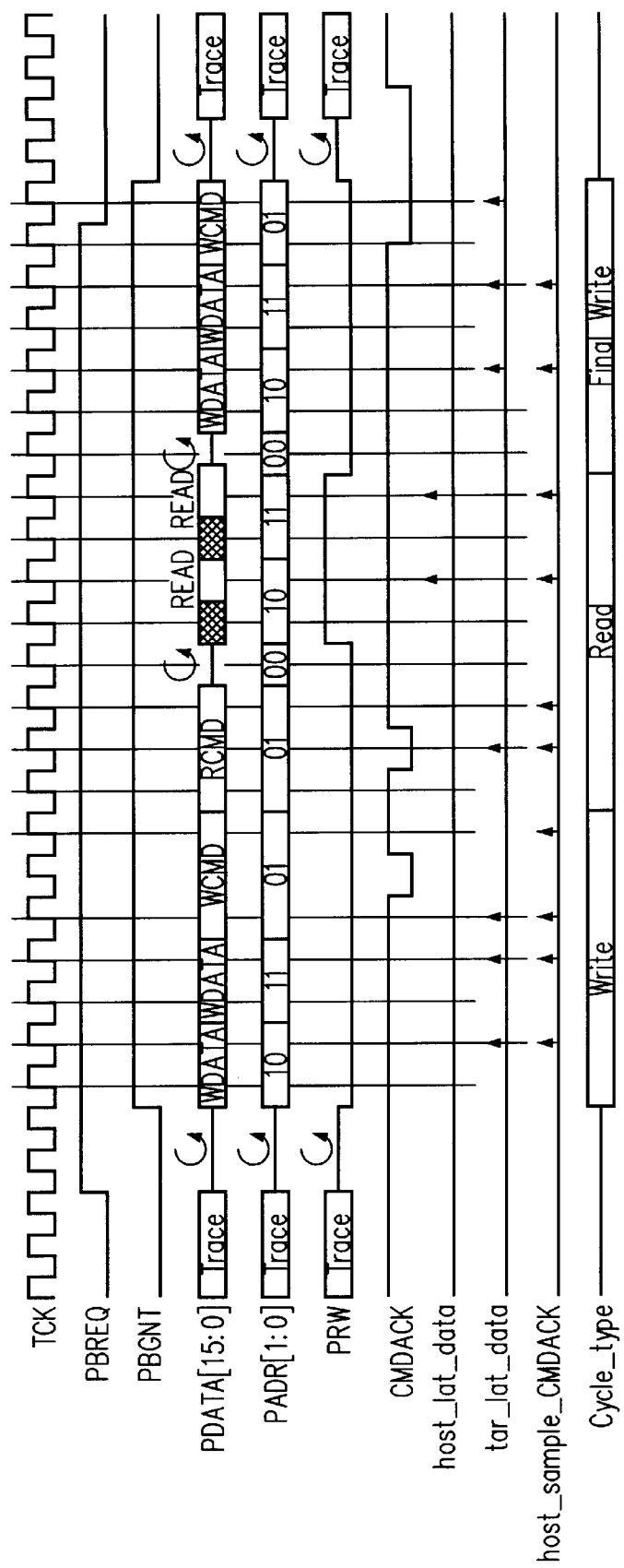
FIG. 9 shows a timing chart of signal behavior for acquisition and release of the parallel debug.

Referring to FIG. 9, signal behavior for acquisition and release of the parallel debug bus is shown. Three complete bus cycles are shown. The sharing of pins between the parallel debug port 214 and the trace port 220 requires that parallel commands be initiated only while the processor is stopped and trace port 220 is disconnected from the shared bus. The request-grant handshake pair of signals PBREQ-PBGNT provides expedited turnaround of the shared bus signals between the trace port 220 and parallel debug port 214. When the host interface to the parallel port sees PBREQ asserted, the host can begin driving the parallel debug port signals to parallel port 214 and assert PBGNT. When PBREQ is deasserted, the host interface to parallel port 214 responds by tri-stating its signals and deasserting PBGNT to indicate that it is off the bus. To prevent bus contention, devices driving the parallel debug port 214 should be tristated whenever PBGNT is deasserted.

FIG. 9 shows a sequence of a write (WDATA) to the upper 16 bits of debug register, a write (WDATA) to the lower sixteen bits of debug register, a write to the command register (WCMD), a read command (RCMD) followed by a read of the upper and lower bits of the debug register. Finally, a write (WDATA) to the upper 16 bits of debug register, a write (WDATA) to the lower sixteen bits of debug register, and write to the command register (WCMD) is shown before the bus returns to a trace operation. Arrows in FIG. 9 indicate when the host (host_lat_data) and target (tar_lat_data) latch data during read and write operations, respectively.

The serial/parallel debug command register uses a 4-bit command field to point to the various internal registers and functions provided in the debug interface. The command register is accessible only via the serial/parallel debug interface in the illustrated embodiment. Some of the commands use bits from the debug_data field as a sub-field to extend the number of available commands. Table 7 provides the available commands in one embodiment.

TABLE 7

| Command Code | | Definition |
|---|---|---|
| 0000 | | Null (not recognized by hardware, Finished flag not set) |
| 0001 | | Load Soft Address register |
| 0010 | | general register read |
| 0011 | | general register write |
| 0100 | | Serial/parallel Debug register read |
| 0101 | | Serial/parallel Debug register write |
| 0110 | | reserved |
| 0111 | | Misc. Serial/parallel Debug functions per debug_data[3:0] |
| | 0 | exit via RESET (hard reset) |
| | 1 | exit via SRESET (soft reset) |
| | 2 | Instruction step (may destroy soft address) Bit 7 of the Debug Control/Status register or the external STOPTX pin should be monitored to determine when the instruction step is completed. Unlike the TF bit, this command will step into interrupts. |
| | 3 | peripheral reset (CPU not reset) |
| | 4 | Read trace buffer at displacement given in [soft address] |
| | 5 | exit to instruction at EIP |
| | all others | null |
| 1000 | | 8-bit memory write to [soft address] |
| 1001 | | 16-bit memory write to [soft address] |
| 1010 | | 32-bit memory write to [soft address] |
| 1011 | | 8-bit output to [soft address] (I/O cycle) |
| 1100 | | 16-bit output to [soft address] (I/O cycle) |
| 1101 | | 32-bit output to [soft address] (I/O cycle) |
| 1110 | | Input or read per debug_data [3:0] |
| | 0 | 8-bit read from [soft_address] |
| | 1 | 16-bit read from [soft_address] |
| | 2 | 32-bit read from [soft_address] |
| | 3 | 8-bit input from [soft_address] (I/O cycle) |
| | 4 | 16-bit input from [soft_address] (I/O cycle) |
| | 5 | 32-bit input from [soft_address] (I/O cycle) |

TABLE 7-continued

| Command Code | | Definition |
|---|---|---|
| | all others | null |
| 1111 | | read/write save/restore data |

A brief description of some of the more basic commands follows. A load soft address register command places a new 32-bit value for soft address pointer in the debug_data field{31:0} together with the command code and the pending bit. The debug logic transfers the data to the Soft Address register and asserts the finished flag and CMDACK signal on completion.

Memory or I/O read and write commands require the soft address register to set up the address/port before hand. For a read, the read data is transferred directly to the debug_data register when the finished flag/CMDACK pin is set. For a write, the data is supplied in the debug_data register along with the command in the debug command register. The address is post incremented by the appropriate size for any read/write transfer to allow block transfers to be done without continually setting up the soft address register. On memory accesses on a microcontroller with multiple physical memory spaces, the appropriate chipset mapping registers should be set up beforehand. Memory accesses occur as data accesses. The memory access can be directed to either normal memory space of System Management Mode (SMM) space based on the setting of the SMMSP bit in the DSCR.

The register read instruction utilizes the register address supplied to the debug_data register via a write command along with the command in the debug command register. The address is transferred to the soft address register to simplify read/modify/write settings of individual bits, and the read register contents are transferred directly to the debug_data register when the finished flag/CMDACK pin is set.

The register write command uses the soft address register to hold the target register write address. The data to be written is supplied in the debug_data register along with the appropriate write command in the debug command register.

Registers accessible through the parallel debug port in an exemplary embodiment of the invention are shown in Table 8.

TABLE 8

| Soft address | Name | Size | Description |
|---|---|---|---|
| 0 | CR0 | [31:0] | Control reg. 0 |
| 1 | CR3 | [31:0] | Control reg. 1 |
| 2 | EFLAGS | [31:0] | Execution flags |
| 3 | EIP | [31:0] | Instruction pointer |
| 4 | EDI | [31:0] | EDI |
| 5 | ESI | [31:0] | ESI |
| 6 | EBP | [31:0] | EBP |
| 7 | ESP | [31:0] | ESP |
| 8 | EBX | [31:0] | EBX |
| 9 | EDX | [31:0] | EDX |
| 10 | ECX | [31:0] | ECX |
| 11 | EAX | [31:0] | EAX |
| 12 | DR6 | [31:0] | debug status register (initial state) |
| 13 | DR7 | [31:0] | debug control register |
| 14 | TR | [15:0] | Task selector |
| 15 | LDTR | [15:0] | Local Descriptor table selector |
| 16 | GS | [15:0] | GS selector |
| 17 | FS | [15:0] | FS selector |
| 18 | DS | [15:0] | DS selector |
| 19 | SS | [15:0] | SS selector |
| 20 | CS | [15:0] | CS selector |
| 21 | ES | [15:0] | ES selector |
| 22 | TSS_ATTR | [11:0] | task segment attribute |
| 23 | TSS_BASE | [31:0] | task segment base |
| 24 | TSS_LIM | [31:0] | task segment limit |
| 25 | IDTR_ATTR | [11:0] | interrupt descriptor attribute |
| 26 | IDTR_BASE | [31:0] | interrupt descriptor base |
| 27 | IDTR_LIM | [31:0] | interrupt descriptor limit |
| 28 | GDTR_ATTR | [11:0] | global descriptor attribute |
| 29 | GDTR_BASE | [31:0] | global descriptor base |
| 30 | GDTR_LIM | [31:0] | global descriptor limit |
| 31 | LDTR_ATTR | [11:0] | local descriptor attribute |
| 32 | LDTR_BASE | [31:0] | local descriptor base |
| 33 | LDTR_LIM | [31:0] | local descriptor limit |
| 34 | GS_ATTR | [11:0] | GS segment attribute |
| 35 | GS_BASE | [31:0] | GS segment base |
| 36 | GS_LIM | [31:0] | GS segment limit |
| 37 | FS_ATTR | [11:0] | FS segment attribute |
| 38 | FS_BASE | [31:0] | FS segment base |
| 39 | FS_LIM | [31:0] | FS segment limit |

TABLE 8-continued

| Soft address | Name | Size | Description |
|---|---|---|---|
| 40 | DS_ATTR | [11:0] | DS segment attribute |
| 41 | DS_BASE | [31:0] | DS segment base |
| 42 | DS_LIM | [31:0] | DS segment limit |
| 43 | SS_ATTR | [11:0] | SS segment attribute |
| 44 | SS_BASE | [31:0] | SS segment base |
| 45 | SS_LIM | [31:0] | SS segment limit |
| 46 | CS_ATTR | [11:0] | CS segment attribute |
| 47 | CS_BASE | [31:0] | CS segment base |
| 48 | CS_LIM | [31:0] | CS segment limit |
| 49 | ES_ATTR | [11:0] | ES segment attribute |
| 50 | ES_BASE | [31:0] | ES segment base |
| 51 | ES_LIM | [31:0] | ES segment limit |
| 52 | EIP_PREV | [31:0] | previous EIP |
| 53 | IO_TRAP | [31:0] | I/O trap word |
| 54 | RESTART | [31:0] | I/O [31:16] and HALT [15:0] restart words |
| 55 | REV_ID | [31:0] | SMM revision identifier |
| 56 | SMBASE | [31:0] | State dump base |
| 57 | DR6_UPDATE | [31:0] | Updated DR6 |
| 59 | CR2 | [31:0] | CR2 |
| 60 | DR0 | [31:0] | breakpoint 0 linear address |
| 61 | DR1 | [31:0] | breakpoint 1 linear address |
| 62 | DR2 | [31:0] | breakpoint 2 linear address |
| 63 | DR3 | [31:0] | breakpoint 3 linear address |

The ordering or the presence of any particular command shown in Table 8 is not considered critical to the invention but show an exemplary set of commands for use on one version of an X86 processor.

Use of the bond-out port provides full visibility of execution history, without requiring throttling back of the processor core 104. The trace cache 200, if needed, can be configured for use as a buffer to the parallel port 214 to alleviate any bandwidth matching issues.

The parallel port is enabled by setting DSCR:3 to a logic 1 via the serial port. The serial port interface is not disabled when the parallel port is enabled and must be used for access while the processor is executing instructions.

In the disclosed embodiment of the invention, the operation of all debug supporting features, including the trace cache 200, can be controlled through the debug port 100 or via processor instructions. These processor instructions may be from a monitor program, target hosted debugger, or conventional pod-wear. The debug port 100 performs data moves which are initiated by serial data port commands rather than processor instructions.

Operation of the processor from conventional pod-space is very similar to operating in DEBUG mode from a monitor program. All debug operations can be controlled via processor instructions. It makes no difference whether these instructions come from pod-space or regular memory. This enables an operating system to be extended to include additional debug capabilities.

Of course, via privileged system calls such a ptrace( ), operating systems have long supported debuggers. However, the incorporation of an on-chip trace cache 200 now enables an operating system to offer instruction trace capability. The ability to trace is often considered essential in real-time applications. In a debug environment according to the present invention, it is possible to enhance an operating system to support limited trace without the incorporation of an "external" logic analyzer or in-circuit emulator.

Examples of instructions used to support internal loading and retrieving of trace cache 200 contents include a load instruction trace cache record command LITCR and a store instruction trace cache record command SITCR. The command LITCR loads an indexed record in the trace cache 200, as specified by a trace cache pointer ITREC.PTR, with the contents of the EAX register of the processor core 104. The trace cache pointer ITREC.PTR is pre-incremented, such that the general operation of the command LITCR is as follows:

*ITREC.PTR<-ITREC.PTR+1;*

*ITREC{ITREC.PTR}<-EAX.*

In the event that the instruction trace record (see description of trace record format below) is smaller that the EAX record, only a portion of the EAX register is utilized.

Similarly, the store instruction trace cache record command SITCR is used to retrieve and store (in the EAX register) an indexed record from the trace cache 200. The contents of the ECX register of the processor core 104 are used as an offset that is added to the trace cache pointer ITREC.PTR to create an index into the trace cache 200. The ECX register is post-incremented while the trace cache pointer ITREC.PTR is unaffected, such that:

*EAX<-ITREC{ECX+ITREC.PTR};*

*ECX<-ECX+1.*

Numerous variations to the format of the LITCR and SITCR commands will be evident to those skilled art.

Extending an operating system to support on-chip trace has certain advantages within the communications industry. It enables the system I/O and communication activity to be maintained while a task is being traced. Traditionally, the use of an in-circuit emulator has necessitated that the processor be stopped before the processor's state and trace can be examined, unlike ptrace( ). This disrupts continuous support of I/O data processing.

Additionally, the trace cache 200 is very useful when used with equipment in the field. If an unexpected system crash occurs, the trace cache 200 can be examined to observe the execution history leading up to the crash event. When used in portable systems or other environments in which power consumption is a concern, the trace cache 200 can be disabled as necessary via power management circuitry.

In the disclosed embodiment of the invention, an instruction trace record is 20 bits wide and consists of two fields, TCODE (Trace Code) and TDATA (Trace Data). A valid bit V may also be included. The TCODE field is a code that identifies the type of data in the TDATA field. The TDATA field contains software trace information used for debug purposes.

| 20 | 19 | 15 | 0 |
|----|----|----|---|
| V | TCODE (Trace Code) | TDATA (Trace Data) | |

In one contemplated embodiment of the invention, the embedded processor device 102 reports eleven different trace codes as set forth in table 9:

TABLE 9

| TCODE # | TCODE Type | TDATA |
|---------|------------|-------|
| 0000 | Missed Trace | Not Valid |
| 0001 | Conditional Branch | Contains Branch Sequence |
| 0010 | Branch Target | Contains Branch Target Address |
| 0011 | Previous Segment Base | Contains Previous Segment Base Address and Attributes |
| 0100 | Current Segment Base | Contains Current Segment Base Address and Attributes |
| 0101 | Interrupt | Contains Vector Number of Exception or Interrupt |
| 0110 | Trace Synchronization | Contains Address of Most Recently Executed Instruction |
| 0111 | Multiple Trace | Contains 2nd or 3rd Record of Entry With Multiple Records |
| 1000 | Trace Stop | Contains Instruction Address Where Trace Capture Was Stopped |
| 1001 | User Trace | Contains User Specified Trace Data |
| 1010 | Performance Profile | Contains Performance Profiling Data |

The trace cache 200 is of limited storage capacity; thus a certain amount of "compression" in captured trace data is desirable. In capturing trace data, the following discussion assumes that an image of the program being traced is available to the host system H. If an address can be obtained from a program image (Object Module), then it is not provided in the trace data. Preferably, only instructions which disrupt the instruction flow are reported; and further, only those where the target address is in some way data dependent. For example, such "disrupting" events include call instructions or unconditional branch instructions in which the target address is provided from a data register or other memory location such as a stack.

As indicated in the preceding table, other desired trace information includes: the target address of a trap or interrupt handler; the target address of a return instruction; a conditional branch instruction having a target address which is data register dependent (otherwise, all that is needed is a 1-bit trace indicating if the branch was taken or not); and, most frequently, addresses from procedure returns. Other information, such as task identifiers and trace capture stop/start information, can also be placed in the trace cache 200. The precise contents and nature of the trace records are not considered critical to the invention.

FIG. 6A illustrates an exemplary format for reporting conditional branch events. In the disclosed embodiment of the invention, the outcome of up to 15 branch events can be grouped into a single trace entry. The 16-bit TDATA field (or "BFIELD") contains 1-bit branch outcome trace entries, and is labeled as a TCODE=0001 entry. The TDATA field is initially cleared except for the left most bit, which is set to 1. As each new conditional branch is encountered, a new one bit entry is added on the left and any other entries are shifted to the right by one bit.

Using a 128 entry trace cache 200 allows 320 bytes of information to be stored. Assuming a branch frequency of one branch every six instructions, the disclosed trace cache 200 therefore provides an effective trace record of 1,536 instructions. This estimate does not take into account the occurrence of call, jump and return instructions.

In the disclosed embodiment of the invention, the trace control logic 218 monitors instruction execution via processor interface logic 202. When a branch target address must be reported, information contained within a current conditional branch TDATA field is marked as complete by the trace control logic 218, even if 15 entries have not accumulated. As shown in FIG. 6B, the target address (in a processor-based device 102 using 32-bit addressing) is then recorded in a trace entry pair, with the first entry (TCODE=0010) providing the high 16-bits of the target address and the second entry (TCODE=0111) providing the low 16-bits of the target address. When a branch target address is provided for a conditional jump instruction, no 1-bit branch outcome trace entry appears for the reported branch.

Referring now to FIG. 6C, it may be desirable to start and stop trace gathering during certain sections of program execution; for example, when a task context switch occurs. When trace capture is stopped, no trace entries are entered into the trace cache 200, nor do any appear on the bond-out pins of trace port 214. Different methods are contemplated for enabling and disabling trace capture. For example, an x86 command can be provided, or an existing x86 command can be utilized to toggle a bit in an I/O port location. Alternatively, on-chip breakpoint control registers (not shown) can be configured to indicate the addresses where trace capture should start/stop. When tracing is halted, a trace entry (TCODE=1000, TCODE=0111) recording the last trace address is placed in the trace stream. When tracing is resumed, a trace synchronization entry (TCODE=0110, TCODE=0111) containing the address of the currently executing instruction is generated.

It may be important to account for segment changes that occur while tracing is stopped. This situation can be partially resolved by selecting an option to immediately follow a TCODE=1000 entry with a current segment base address entry (TCODE=0100, TCODE=0111), as shown in FIG. 6C. A configuration option is also desirable to enable a current segment base address entry at the end of a trace prior to entering Debug mode. By contrast, it may not be desirable to provide segment base information when the base has not changed, such as when an interrupt has occurred.

Referring to FIG. 6D, following the occurrence of an asynchronous or synchronous event such as an interrupt or trap, a TCODE=0101 trace entry is generated to provide the address of the target interrupt handler. However, it is also desirable to record the address of the instruction which was interrupted by generating a trace synchronization (TCODE=0110) entry immediately prior to the interrupt entry, as well as the previous segment base address (TCODE=0011). The trace synchronization entry contains the address of the last instruction retired before the interrupt handler commences.

FIG. 6E illustrates a trace entry used to report a change in segment parameters. When processing a trace stream in accordance with the invention, trace address values are combined with a segment base address to determine an instruction's linear address. The base address, as well as the default data operand size (32 or 16-bit mode), are subject to change. As a result, the TCODE=0011 and 0111 entries are configured to provide the information necessary to accurately reconstruct instruction flow. The TDATA field corresponding to a TCODE=0011 entry contains the high 16-bits of the previous segment base address, while the associated TCODE=0111 entry contains the low 15 or 4 bits (depending on whether the instruction is executed in real or protected mode). The TCODE=0111 entry also preferably includes bits indicating the current segment size (32-bit or 16-bit), the operating mode (real or protected), and a bit indicating whether paging is being utilized. Segment information generally relates to the previous segment, not a current (target) segment. Current segment information is obtained by stopping and examining the state of the processor core 104.

There are circumstance when an application program or operating system may wish to add additional information into a trace stream. For this to occur, an x86 instruction is preferably provided which enables a 16-bit data value to be placed in the trace stream at a desired execution position. The instruction can be implemented as a move to I/O space, with the operand being provided by memory or a register. When the processor core 104 executes this instruction, the user specified trace entry is captured by the trace control logic 218 and placed in the trace cache 200. As shown in FIG. 6F, a TCODE=1001 entry is used for this purpose in the disclosed embodiment of the invention. This entry might provide, for example, a previous or current task identifier when a task switch occurs in a multi-tasking operating system.

When executing typical software on a processor-based device 102 according to the disclosed embodiment of the invention, few trace entries contain address values. Most entries are of the TCODE=0001 format, in which a single bit indicates the result of a conditional operation. When examining a trace stream, however, data can only be studied in relation to a known program address. For example, starting with the oldest entry in the trace cache 200, all entries until an address entry are of little use. Algorithm synchronization typically begins from a trace entry providing a target address.

The processor can provide trace synchronization information to ensure that address information for reconstructing instruction execution flow is provided in trace records with sufficient frequency. If the trace cache 200 contains no entries providing an address, then trace analysis cannot occur. This situation is rare, but possible. A trace record (or an indication in a trace record), is provided for instructions that change the program flow such as conditional branches. However, as previously discussed, target address information is not provided in the trace record for instructions such as conditional branches where the branch target address can be determined according to whether the branch was taken or not taken. In such cases, the trace record provides only an indication of whether the branch was taken. Address information is provided, however, for those instructions in which the target address is in some way data dependent and for other synchronizing events shown in Table 9.

For this reason, a synchronization register TSYNC is provided to allow injection of synchronizing address information. In the disclosed embodiment, TSYNC contains 7 bits. If the synchronization register TSYNC is set to zero, then trace synchronization entries are not generated.

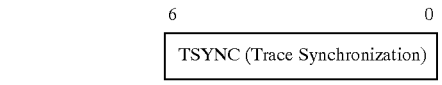

The processor determines whether each trace record includes address information by, e.g., assuming all TCODES except for TCODE=1 are synchronizing events providing address information. Thus, in the described embodiment, each trace entry having a TCODE not equal to "1" causes a counter to be loaded to the value in the TSYNC register which allows the counter to count the desired maximum number of trace records generated before current program address information is provided. Thus, depending on if the counter is configured as an up counter or down counter, the counter is either loaded with zero or the maximum count, respectively. The counter counts each trace record produced which does not include address information. When the count of such trace records reaches the predetermined number; trace logic provides the current program address as a trace entry, thereby providing said trace synchronization information.

For this reason, a synchronization register TSYNC is provided to allow injection of synchronizing address information. In the disclosed embodiment, TSYNC contains 7 bits. If the synchronization register TSYNC is set to zero, then trace synchronization entries are not generated.

FIG. 6G depicts an exemplary trace synchronization record. The first entry, with a TCODE=6, provides the most significant 16 bits of the extended instruction pointer (EIP) for the current instruction logical address. The next entry, TCODE=7, provides the least significant 16 bits.

Trace entry information can also be expanded to include data relating to code coverage or execution performance. This information is useful, for example, for code testing and performance tuning. Even without these enhancements, it is desirable to enable the processor core 104 to access the trace cache 200. In the case of a microcontroller device, this feature can be accomplished by mapping the trace cache 200 within a portion of I/O or memory space. A more general approach involves including an instruction which supports moving trace cache 200 data into system memory.

Thus, a processor-based device providing a flexible, high-performance solution for furnishing instruction trace information has been described. The processor-based device incorporates an instruction trace cache capable of providing trace information for reconstructing instruction execution flow on the processor without halting processor operation. Both serial and parallel communication channels are provided for communicating trace data to external devices. The disclosed on-chip instruction trace cache alleviates various of the bandwidth and clock synchronization problems that arise in many existing solutions, and also allows less expensive external capture hardware to be utilized.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A processor comprising:

a processor core;

a serial debug port formed of a plurality of pins configured to send and receive signals to and from external debug equipment;

a parallel debug port formed of a plurality of pins configured to send and receive signals to and from external debug equipment;

a plurality of debug registers accessible to said serial port and said parallel debug port, and coupled to said processor core for receiving and providing debug data and control signals;

an on-chip trace memory coupled to said processor core and said serial debug port, said trace memory for storing trace information indicative of program execution order in said processor core;

wherein said processor core performs debug operations in response to signals from said external debug equipment sent over one of said parallel and serial debug ports.

2. The processor of claim 1, wherein said serial debug port includes conventional JTAG signals TMS, TCK, TDI and TDO.

3. The processor of claim 1, wherein the contents of said debug registers are coupled to be examined by said debug equipment without halting normal processor operation via said serial debug port.

4. The processor as recited in claim 1 wherein said pins of said parallel debug port includes pins providing a read/write control line, a bus request line and a bus grant line for coupling to said external debug equipment.

5. The processor as recited in claim 1 wherein said pins of said parallel debug port includes pins providing 16 bits of data in parallel.

6. The processor as recited in claim 1 wherein the processor is coupled to said debug equipment via both said serial and parallel debug ports.

7. A method of sending and receiving debug information between a processor-based device and external debug equipment, comprising:

sending debug information serially to and from a serial debug port in the processor-based device;

providing a trace memory in said processor-based device, said trace memory storing information indicative of an order in which instructions are executed by said processor based device;

providing a parallel debug port formed of a plurality of pins configured to send and receive debug signals in parallel;

accessing one of a plurality of debug registers via one of said serial and parallel debug ports, said debug registers being accessible to both said serial debug port and said parallel debug port;

performing a debug operation in said processor-based device in response to signals received at one of said parallel and serial debug ports; and communicating results of said debug operation from said processor-based device over one of said parallel and serial debug ports.

8. The method as recited in claim 7 wherein said serial debug port provides data over a serial data out line to said external software debug controller and receives data over a serial data in line from said external software debug controller.

9. The method as recited in claim 7 further comprising providing, a read/write control line, a bus request line and a bus grant line on said parallel port for coupling to said external software debug controller.

10. The method as recited in claim 7 wherein said parallel debug port sends and receives at least 16 data bits in parallel.

11. The method as recited in claim 7 further comprising sending a debug command via said serial debug port to enable said parallel debug port.

12. The method as recited in claim 11 further comprising sending debug information to and from said parallel debug port after said parallel debug port has been enabled via said debug command sent via said serial debug port.

13. A method for enabling a debug port in a processor-base device, the processor-based device including a serial debug port and a parallel debug port, the method comprising:

receiving debug information serially into said serial debug port to enable said parallel debug port; and accessing one of a plurality of debug registers in said processor-based device via said parallel debug port after said parallel debug port has been enabled.

14. A processor comprising:

a processor core;

a serial debug port formed of a plurality of pins configured to send and receive signals to and from external debug equipment;

a parallel debug port formed of a plurality of pins for communicating with external debug equipment, wherein said pins of said parallel debug port include a read/write control line, a bus request line and a bus grant line for coupling to said external debug equipment; and a plurality of debug registers for receiving and providing debug data and control signals accessible to said serial port and said parallel debug port, and coupled to said processor core.

* * * * *